United States Patent Office 2,987,384
Patented June 6, 1961

2,987,384
BORON ADDITIVE CONTAINING 2,2-DIMETHOXY PROPANE
Everett C. Hughes, Shaker Heights, Ohio, assignor to The Standard Oil Company, Cleveland, Ohio, a corporation of Ohio
No Drawing. Filed Feb. 12, 1958, Ser. No. 714,683
4 Claims. (Cl. 44—63)

This invention relates to a novel boron composition for a gasoline which possesses improved liquid phase stability at low temperatures. In particular, this invention pertains to a boron composition containing a small percentage of 2,2-dimethoxy propane as a solvent for effectively stabilizing the composition in a liquid phase free of solids at temperatures as low as −40° F.

The advantageous effects of incorporating small amounts of boron compounds into commercial gasolines are disclosed in Patent No. 2,741,548, assigned to my assignee. These boron-containing leaded motor fuels are now in extensive commercial use and have received wide acceptance by the consuming public. Even though the boron composition is added in very small percentages to the gasoline sold in commerce, the amount of boron composition that must be prepared for plant blending with gasoline is quite substantial. For blending purposes with the gasoline, it is obviously most desirable to have the composition in liquid form so that it may be easily pumped and metered during the blending operation. Slurries and solids cannot be handled in this manner, and special means adaptable to handling a product in such a state would reflect a sharp increase in plant costs.

Two preferred compounds which have been used to introduce boron into gasolines are 2-methyl pentanediol-2,4 hydrogen borate and bis-(2-methyl pentanediol-2,4) diborate. The former compound (which will be referred to hereinafter as the ester) is a solid. The latter compound (which will be referred to hereinafter as the anhydride) is a liquid and is readily mixed with gasoline. From this it can be readily seen that for blending purposes it would be desirable to use the anhydride as the boron additive for gasoline. However, this boron compound is more difficult to prepare on a commercial basis inasmuch as water must be removed azeotropically in order to convert the ester to the anhydride. Furthermore, the anhydride readily reacts with water to form the ester, and it is often difficult to protect the anhydride from moisture. These phenomena can be seen from the following equation:

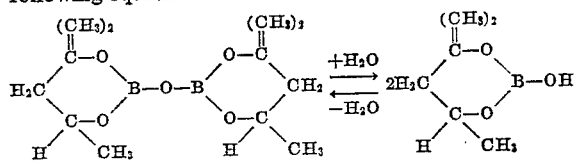

If a boron composition is prepared from a mixture of the two compounds above, it is found that unless more than 75 of the product is the anhydride the remaining ester is insoluble in the anhydride and large proportions of a solvent such as toluene or benzene is needed to make the product a homogeneous solution. The use of a solvent in preparing the composition becomes undesirable because of added costs and the need for precautionary measures required in the plant for handling these solvents.

As a commercial practice, it is possible to prepare a blend of the two compounds mentioned above directly from the starting ingredients, boric acid and 2-methyl 2,4-pentanediol, when these materials are reacted in a 1:1 molar ratio. In this manner, some of the 2-methyl pentanediol-2,4 hydrogen borate which is formed initially is converted into the bis-(2-methyl pentanediol-2,4) diborate compound by further dehydration. It is economically practical, following this procedure, to obtain blends wherein the ester is reduced to 25%, the remaining 75% of the reaction product being the anhydride. However, this reaction mixture will not remain as a homogeneous solution for normal plant blending, and as discussed above, it would be necessary to use substantial proportions of a solvent to safeguard against a solid phase separation.

In accordance with this invention, it has been found that the ester content of the above reaction mixture can be further reacted by the simple addition of a minor percentage of 2,2-dimethoxy propane, resulting in the formation of an additive composition stable against phase separation at depressed temperatures.

It may be postulated that the over-all reaction mechanism by which 2,2-dimethoxy propane produces this effect is as follows:

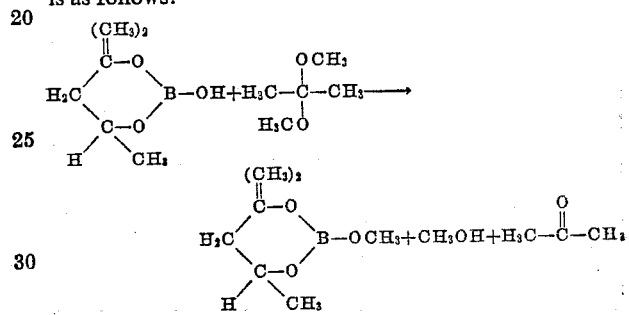

The methyl ester of the 2-methyl pentanediol-2,4-hydrogen borate formed in accordance with the above reaction is readily soluble in the anhydride and is, in itself, a fluid material stable against phase separation at low temperatures. Therefore, although the ester content of the boron additive composition may be fully reacted into more stable low temperature products, normally this is not necessary in order to obtain a reaction mixture which is sufficiently stable in the liquid phase for storage and plant blending into gasoline at very low temperatures.

Since methanol and acetone have an excellent low temperature solubilizing effect on the ester, the invention makes it possible for methanol and acetone, as they are produced, to assist in stabilizing the additive composition and thereby effect a possible reduction in the amount of 2,2-dimethoxy propane that would stoichiometrically be required to stabilize the additive composition to any given temperature.

The hydrolysis products acetone and methanol also provide important auxiliary benefits to the composition, making the boron composition a multi-purpose additive for gasoline. The presence of both hydrolysis products in the gasoline, due to their attraction for water, would aid measurably in preventing fuel line freezing. These products would also be effective in reducing carburetor icing, which is a common ailment of the gasoline engine operating in certain weather conditions. Furthermore, these products would also improve the volatility characteristics of the motor fuel.

Compositions containing more than 50% of the ester are not practical to treat by the invention, and compositions containing less than 5% of the ester (more than 95% of the anhydride) do not need the treatment. Generally, the amount of the ester will be 20 to 30%. The minimum amount of the 2,2-dimethoxy propane is 25% of that stoichiometrically required to react with the ester in the additive composition comprising ester and anhydride in the above proportions.

The addition of more than the amount of 2,2-dimethoxy propane required to react with the ester would also produce auxiliary benefits. The powerful dehydrating effect of this material would be quite advantageous in the prevention of fuel line freezing. The extent of its use in excess of that required to stabilize the boron composition would in large part be dictated by economic considerations, but in general an amount greater than 25%, based on the additive composition comprising ester and anhydride, cannot be justified.

The best mode of carrying out my invention which I contemplate is as follows. This composition is prepared to provide liquid phase stability at −40° F.

A boron composition containing 25% ester and 75% anhydride (as defined above) was tested for its crystallization temperature under conditions which avoided moisture contamination and which prevented supercooling. The lowest temperature at which a stable liquid phase of this composition will exist free of solid is 79° F. To the above composition of 25% ester and 75% anhydride, 2,2-dimethoxy propane was added stepwise and it was determined that the addition of 7.3 weight per cent, equivalent to 40% of the amount required to react with the ester, produces a composition stable at −40° F.

The calculated theoretical minimum amount of 2,2-dimethoxy propane required to reduce the ester content from 25% to 0% in the sample by stoichiometric dehydration is 18.2 weight percent, as compared to the 7.3 weight percent actually employed above to stabilize the composition to −40° F. The lesser amount required can be explained by the hydrolysis products of methanol and acetone formed by the hydrolysis of some of the 2,2-dimethoxy propane added to the original boron composition.

As may be noted, the 2,2-dimethoxy propane may be added to the original boron composition by the use of simple mixing equipment, and therefore the invention lends itself readily to commercial adaptation. The addition may be carried out in the same reaction vessel where the 75% anhydride and 25% ester mixture is formed from the original reaction ingredients.

Obviously, the degree of stability and the extent of auxiliary benefit attained by this invention for the type of boron composition described herein is dependent upon the amount of 2,2-dimethoxy propane added to the original composition.

It is intended, therefore, that the scope of this invention is limited only by the claims appended hereto.

I claim:

1. A composition of matter consisting essentially of the reaction mixture obtained by adding together an admixture of from 5 to 50 weight percent of 2-methyl pentanediol-2,4-hydrogen borate and from 95 to 50 weight percent bis-(2-methylpentanediol-2,4) diborate with an amount of 2,2-dimethoxy propane which is at least 25% of that stoichiometrically required to react with the 2-methyl pentanediol-2,4 hydrogen borate present in said admixture, but not more than 25% of the total amount of said admixture.

2. A composition of matter consisting essentially of the reaction mixture obtained by adding together an admixture of from 15 to 30 weight percent of 2-methyl pentanediol-2,4 hydrogen borate and from 85 to 70 weight percent bis-(2-methyl pentanediol-2,4) diborate with an amount of 2,2-dimethoxy propane which is at least 25% of that stoichiometrically required to react with the 2-methyl pentanediol-2,4 hydrogen borate present in said admixture but not more than 25% of the total amount of said admixture.

3. A composition of matter consisting essentially of the reaction mixture obtained by adding together an admixture of 25 weight percent 2-methyl pentanediol-2,4 hydrogen borate and 75 weight percent bis-(2-methyl pentanediol-2,4) diborate with an amount of 2,2-dimethoxy propane which is 40% of that stoichiometrically required to react with the 2-methyl pentanediol-2,4 hydrogen borate present in said admixture.

4. The method of preparing a composition of matter consisting essentially of the mixture of 2-methyl pentanediol-2,4 hydrogen borate and bis-(2-methyl pentanediol-2,4) diborate in a major proportion so that said composition is stabilized in liquid phase at temperatures down to −40° F. comprising the step of adding 2,2-dimethoxy propane to and reacting with an admixture of from 5 to 50 weight percent of 2-methyl pentanediol-2,4 hydrogen borate and from 95 to 50 weight percent bis-(2-methyl pentanediol-2,4) diborate, said 2,2-dimethoxy propane being added in an amount which is at least 25% of that stoichiometrically required to react with the 2-methyl pentanediol-2,4 hydrogen borate present in said admixture but not more than 25% of the total amount of said admixture whereby said stabilization in liquid phase is obtained.

References Cited in the file of this patent
UNITED STATES PATENTS

| | | |
|---|---|---|
| 2,741,548 | Darling et al. | Apr. 10, 1956 |
| 2,767,069 | Fay et al. | Oct. 16, 1956 |
| 2,839,564 | Garner | June 17, 1958 |
| 2,848,312 | Liao | Aug. 19, 1958 |
| 2,878,109 | Wood et al. | Mar. 17, 1959 |

OTHER REFERENCES

"Aviation Gasoline Manufacture," by Van Winkle, first ed., McGraw-Hill, 1944, pages 216–223.